3,210,392
LOWER ALKANOYL ESTERS OF 11-OXYGENATED ANDROST-4-ENE-3β,17β-DIOLS AND INTERMEDIATES THERETO
John S. Baran, Morton Grove, Ill., assignor to G. D. Searle & Co., Chicago, Ill., a corporation of Delaware
No Drawing. Filed July 10, 1963, Ser. No. 294,138
13 Claims. (Cl. 260—397.45)

The present invention is concerned with 3,11,17-trisoxygenated androstane derivatives and, more particularly, with 11-keto and 11β-hydroxy derivatives of optionally 17-alkylated 3β,17β-bisoxygenated androst-4-enes wherein one or both of the 3β and 17β substituents is an acyloxy function. These compounds are conveniently depicted by the following structural formula

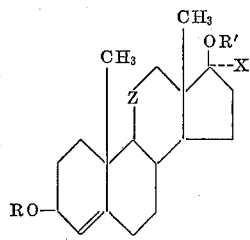

wherein R and R' can be hydrogen or a lower alkanoyl radical, X represents hydrogen or a lower alkyl radical, and Z is either a carbonyl or β-hydroxymethylene group.

The lower alkanoyl radicals designated by R and R' in the foregoing representation include acetyl, propionyl, butyryl, valeryl, caproyl, and the branched-chain isomers thereof. Examples of the lower alkyl radicals encompassed by the X term are methyl, ethyl, propyl, isopropyl, butyl, isobutyl, pentyl, isopentyl, tert-pentyl, and hexyl.

The compounds of the present invention can be manufactured by reaction of the corresponding hydroxy substances with a suitable acylating agent. Such reagents are the anhydrides or halides of lower alkanoic acids. Particularly suitable halides are the alkanoyl chlorides. This acylation process is preferably conducted in the presence of an alkaline catalyst such as pyridine, triethylamine, etc. That process is specifically illustrated by the reaction of 3β,17β-dihydroxyandrost-4-en-11-one with acetic anhydride and pyridine to afford 3β,17β-dihydroxyandrost-4-en-11-one 3,17-diacetate and also by the reaction of androst-4-ene-3β-11β,17β-triol with propionic anhydride, resulting in androst-4-ene-3β,11β,17β-triol 3,17-dipropionate. It is apparent that the 11-hydroxy group remains unaffected in the instant process.

A process particularly suitable for the preparation of the 17-monoacyloxy compounds of this invention involves reduction of the corresponding 17- monoacyloxyandrost-4-ene-3,11-diones. A relatively short reaction time and minimum amount of reagent results in preferential reduction of the 3-keto group. Thus, for example, 17β-hydroxyandrost-4-ene-3,11-dione 17-acetate is stirred with lithium tri-(tertiary-butoxy) aluminum hydride in tetrahydrofuran at room temperature for about 2 hours to afford 3β,17β-dihydroxyandrost-4-en-11-one 17-acetate. When excess reagent is used and the reaction time is appreciably increased, reduction occurs at both the 3 and 11 positions. Typically, the aforementioned 17β-hydroxyandrost-4-ene-3-11-dione 17-acetate is stirred with excess lithium tri-(tertiary-butoxy) aluminum hydride in tetrahydrofuran for about 48 hours at room temperature to yield androst-4-ene-3β,11β,17β-triol 17-acetate.

The aforementioned 17-monoacyloxy compounds can serve as starting materials for the preparation of the instant 3,17-diacyloxy derivatives wherein the acyl groups are dissimilar. The reaction of androst-4-ene-3β,11β,17β-triol 17-acetate, for example, with propionic anhydride and pyridine results in androst -4-ene-3β,11β,17β-triol 17-acetate, 3-propionate.

The 17α-alkylated compounds of this invention are obtained by a two-step route utilizing 17α-alkyl-11β,17β-dihydroxyandrost-4-en-3-ones as starting materials. The reaction of these materials with a suitable reducing agent by the process hereinbefore described affords the corresponding 17α-alkylandrost-4-ene-3β,11β,17β-triols. The acyloxy derivatives of those triols are prepared by the acylation process described above. As a specific example of these processes, 11β,17β-dihydroxy-17α-methylandrost-4-en-3-one is allowed to react with lithium tri(tertiary-butoxy) aluminum hydride in tetrahydrofuran, and the resulting 17α-methylandrost-4-ene-3β,11β,17β-triol is contacted with acetic anhydride and pyridine at room temperature to produce 17α-methylandrost-4-ene-3β,11β,17β-triol 3-acetate.

A process utilizing 17α,21-dihydroxypregn-4-ene-3,11,20-trione 17,21-diacetate as starting material affords 3-monoacyloxy compounds of the present invention. Thus, that diester is reduced, typically with lithium tri-(tertiary-butoxy) aluminum hydride in tetrahydrofuran, and the resulting 3-hydroxy compound is acylated with the appropriate lower alkanoyl anhydride or halide. Hydrolysis of the 17 and 21 acetate groups is effected by brief contact with dilute methanolic potassium hydroxide, during which treatment the 3-acyloxy group remains intact. The resulting 3β,17α,21-trihydroxypregn-4-ene-11,20-dione 3-mono-(lower alkanoate) is stirred with sodium bismuthate in aqueous acetic acid at room temperature to afford the corresponding 3β-hydroxyandrost-4-ene-11,17-dione 3-mono-(lower alkanoate). The latter substances are converted to the corresponding 17β-hydroxy and 11β,17β-dihydroxy compounds of this invention by the aforementioned reduction processes. Thus, reduction of 17α,21-dihydroxypregn-4-ene-3,11,20-trione 17,21 - diacetate with lithium tri(tertiary-butoxy) aluminum hydride in tetrahydrofuran followed by acetylation of the resulting 3β-ol with acetic anhydride and pyridine and saponification of the 17 and 21 acetate groups with methanolic potassium hydroxide affords 3β,17α,21-trihydroxypregn-4-ene-11,20-dione 3-monoacetate. Oxidation with sodium bismuthate affords 3β-hydroxyandrost-4-ene-11,17-dione 3-acetate. Reduction of that ester with lithium tri-(tertiary-butoxy) aluminum hydride in tetrahydrofuran for two hours yields 3β,17β-dihydroxyandrost-4-en-11-one 3-acetate, while reaction with excess lithium tri-(tertiary-butoxy) aluminum hydride in tetrahydrofuran for 24-48 hours results in androst-4-ene-3β,11β,17β-triol 3-acetate.

The acyloxyandrostane derivatives of the present invention are useful as a result of their valuable pharmacological properties. They are hormonal agents, for example, as is evidenced by their anabolic and anti-inflammatory properties. In addition, they display potent androgenic activity when administered either intramuscularly or orally.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

A mixture of 8 parts of androst-4-ene-3,11,17-trione, 21 parts of lithium tri-(tertiary-butoxy) aluminum hydride, and 178 parts of tetrahydrofuran is stirred at room temperature for about 2 hours, then is poured into approximately 250 parts by volume of 50% aqueous acetic acid. Water is then added to the point of turbidity, and the mixture is extracted with chloroform. The chloroform extract is washed successively with water and dilute aqueous sodium bicarbonate, is dried over anhydrous sodium sulfate, then is concentrated to dryness at reduced pressure. The resulting crystalline product is recrystallized from acetone to afford colorless crystals of 3β,17β - dihydroxyandrost - 4 - en - 11 - one, melting at about 194–197°. Another recrystallization from acetone affords pure material melting at about 215–218°, possessing an optical rotation of +102° in methanol, and displaying infrared absorption maxima at about 2.93, 2.97, 3.38, 5.91, 9.35, 9.62, and 11.70 microns. This compound is characterized further by the structural formula

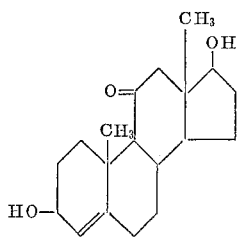

*Example 2*

The substitution of 8 parts of 11β - hydroxyandrost-4 - ene - 3,17 - dione in the procedure of Example 1 results in androst - 4 - ene - 3β,11β,17β - triol, melting at about 225–226°. Two recrystallizations from acetone afford a sample of the pure material melting at about 221–223° and displaying an optical rotation of +84° in methanol.

*Example 3*

A solution containing 8 parts of 3β,17β - dihydroxyandrost - 4 - en - 11 - one, 50 parts of acetic anhydride, and 100 parts of pyridine is stored at room temperature for about 17 hours, then is diluted by the slow addition of a mixture of ice and water. The precipitate which forms is collected by filtration, is washed on the filter with water, then is dried at about 60° under reduced pressure. The resulting crude product, melting at about 167–170°, is 3β,17β - dihydroxyandrost - 4 - en - 11 - one 3,17-diacetate. Further purification is effected by recrystallization from a mixture of acetone and hexane, resulting in material melting at about 174–175°. This compound is characterized further by an optical rotation of +39° in chloroform, by infrared absorption maxima at about 3.39, 5.75, 5.78, 5.83, 7.96, 9.65, and 9.76 microns, and also by the structural formula

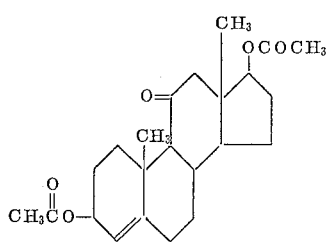

*Example 4*

By substituting 63.7 parts of propionic anhydride and otherwise proceeding according to the processes described in Example 3, 3β,17β - dihydroxyandrost - 4 - en - 11- one 3,17-dipropionate is obtained. It can be represented by the structural formula

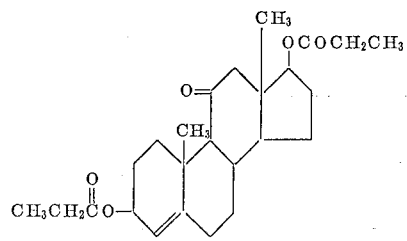

*Example 5*

A solution of 2 parts of androst - 4 - ene - 3β,11β,17β-triol, 10 parts of acetic anhydride, and 20 parts of pyridine is heated at about 90° for about 2 hours, then is cooled and diluted with a mixture of ice and water. The resulting crystalline product is collected by filtration, the is washed on the filter with water, and is dried at reduced pressure. Crystallization of this solid material from methanol affords androst - 4 - ene - 3β,11β,17β-triol 3,17-diacetate, melting at about 142–145°. A pure sample of this substance, melting at about 152–154°, is obtained by recrystallization of the latter material from a mixture of ether and hexane. This compound possesses an optical rotation of +26° in chloroform, exhibits infrared absorption maxima at about 2.88, 3.38, 3.42, 5.75, 5.83, 7.90, 8.08, and 9.56 microns. It is characterized further by the structural formula

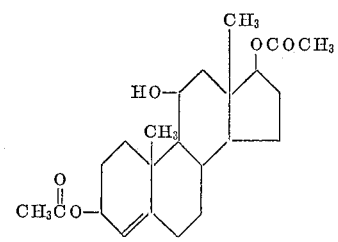

*Example 6*

The substitution of 12.7 parts of propionic anhydride in the procedure described in Example 5 results in androst - 4 - ene 3β,11β,17β - triol 3,17-dipropionate, melting at about 125–130°. Successive recrystallizations from ether-hexane afford the pure material, melting at about 137–138° and displaying an optical rotation of +24° in chloroform. Infrared absorption peaks are observed at 2.82, 3.39, 5.78, 8.28, 9.21, 9.80, 10.88, and 12.85 microns. This substance is represented by the structural formula

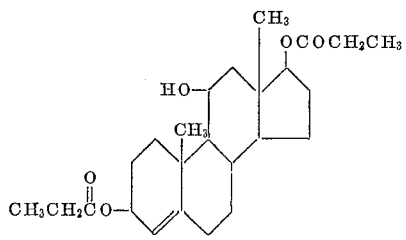

*Example 7*

A mixture of 9.15 parts of 17β-acetoxyandrost-4-ene-3,11-dione, 42 parts of lithium tri-(tertiary-butoxy) aluminum hydride, and 400 parts of tetrahydrofuran is stirred at room temperature for about 48 hours, then is "worked up" by the procedure described in Example 1 to afford androst-4-ene-3β,11β,17β-triol 17-acetate, melting at about 165–169°. Recrystallization from acetonehexane affords the pure substance, melting at about 176–177° and exhibiting an optical rotation of +63° in chloroform. This substance is characterized further by infrared absorption maxima at about 2.75, 2.90, 3.40, 5.78, 7.95, 9.09, and 9.27 microns and also by the structural formula

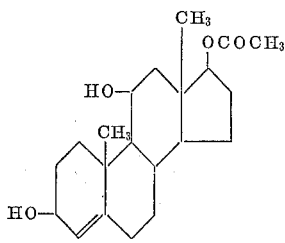

*Example 8*

The substitution of 9.52 parts of 17β-hydroxyandrost-4-ene-3,11-dione 17-propionate in the processes described in Example 7 results in androst-4-ene-3β,11β,17β-triol 17-propionate of the structural formula

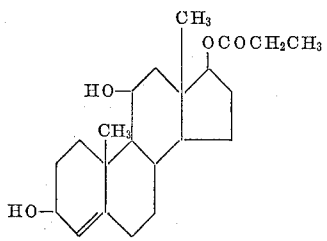

*Example 9*

A mixture of 9.16 parts of androst-4-ene-3β,11β,17β-triol 17-acetate, 63.7 parts of propionic anhydride, and 100 parts of pyridine is kept at room temperature for about 16 hours, then is poured slowly into a mixture of ice and water. The precipitate which forms is collected by filtration, is washed on the filter with water, then is dried at reduced pressure to afford androst-4-ene-3β,11β,17β-triol 17-acetate, 3-propionate, melting at about 124–128°. This crude product is further purified by adsorption on a silica gel chromatographic column followed by elution with 5% ethyl acetate in benzene, resulting in material melting at about 138–139° and displaying an optical rotation of +25°. It is characterized further by the structural formula

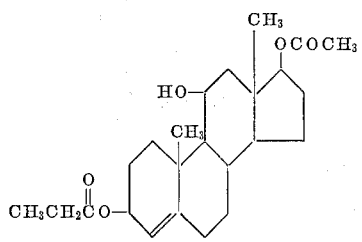

*Example 10*

A solution of 2.5 parts of 11β,17β-dihydroxy-17α-methylandrost-4-en-3-one, 5 parts of lithium tri-(tertiary-butoxy) aluminum hydride, and 89 parts of tetrahydrofuran is stirred at room temperature for about 2 hours, then is cooled to 0–5° by means of an ice bath, and is diluted by the slow addition of 100 parts by volume of 20% aqueous acetic acid. The resulting precipitate is collected by filtration, is washed on the filter with water, and is dried under reduced pressure to afford 17α-methyl-androst-4-ene-3β,11β,17β-triol, melting at about 195–205°. Recrystallization from acetone affords the pure material containing one mole of acetone of crystallization, melting at about 201–203°, and possessing an optical rotation of +52.5° in methanol. Infrared absorption peaks are observed at about 2.89, 3.05, 3.38, 5.75, 7.75, 9.44, 9.71, and 9.90 microns.

A solution of one part of 17α-methylandrost-4-ene-3β,11β,17β-triol, one part of acetic anhydride, and 5 parts of pyridine is stored at room temperature for about 24 hours, then is diluted with water at about 0°. Extraction of this aqueous mixture with chloroform affords an organic solution which is washed successively with dilute hydrochloric acid, water, and dilute aqueous sodium bicarbonate, then is dried over anhydrous magnesium sulfate and concentrated to dryness at reduced pressure. The resulting residue is crystallized from aqueous methanol by allowing the solvent to evaporate slowly, thus affording crystals, which are collected by filtration and dried under reduced pressure at about 60° to yield 17α-methylandrost-4-ene-3β,11β,17β-triol 3-acetate, melting at about 80–85°. This crude product is recrystallized from aqueous methanol to afford the pure material, melting at about 86–88° and displaying an optical rotation of +22.5° in chloroform. Infrared absorption maxima are observed at about 2.82, 3.38, 5.75, 7.27, 8.02, 9.20, 9.72, and 10.15 microns. This compound is further characterized by the structural formula

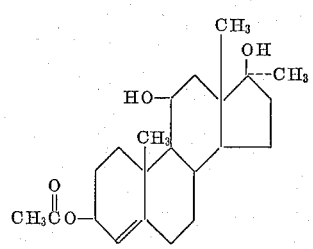

*Example 11*

The reduction of 2.6 parts of 17α-ethyl-11β,17β-dihydroxyandrost-4-en-3-one by the process described in Example 10 results in 17α-ethylandrost-4-ene-3β,11β,17β-triol.

A mixture of 8.8 parts of 17α-ethylandrost-4-ene-3β,11β,17β-triol, 63.7 parts of propionic anhydride, and 100 parts of pyridine is allowed to stand at room temperature for about 24 hours, then is poured slowly into a mixture of ice and water. The precipitate which results is collected by filtration, is based on the filter with water, and is dried at reduced pressure to afford 17α-ethylandrost-4-ene-3β,11β,17β-triol 3-propionate, represented by the structural formula

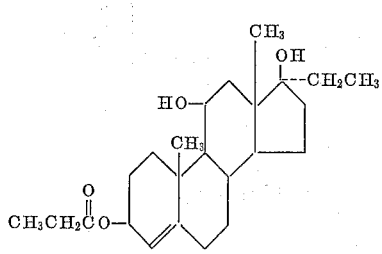

*Example 12*

The substitution of 9.15 parts of 17β-hydroxy-androst-4-ene-3,11-dione 17-acetate in the procedure of Example 1 results in 3β,17β-dihydroxyandrost-4-en-11-one 17-acetate of the structural formula

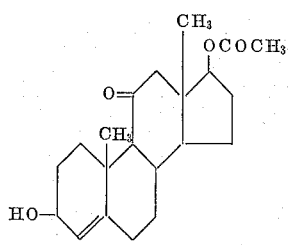

*Example 13*

A mixture of 6.25 parts of 17α,21-diacetoxypregn-4-ene-3,11,20-trione, 6.25 parts of lithium tri-(tertiary-butoxy)

aluminum hydride, and 89 parts of anhydrous tetrahydrofuran is stirred at room temperature for about one hour, then is acidified by the addition of approximately 100 parts of 15% aqueous acetic acid. The chlorofrom solution is separated, washed successively with water and dilute aqueous sodium bicarbonate, then is dried over anhydrous sodium sulfate and distilled to dryness at reduced pressure. The resulting residue is dissolved in a mixture of 20 parts of pyridine and 10 parts of acetic anhydride, then is kept at room temperature for about 16 hours. Dilution with water at about 0° affords an aqueous mixture which is extracted with ether. This ether solution is separated, washed successively with dilute hydrochloric acid, saturated aqueous sodium chloride, and dilute aqueous sodium bicarbonate, then is dried by means of anhydrous sodium sulfate and concentrated to dryness at reduced pressure. The residue is dissolved in benzene and the solution is adsorbed on a silica gel chromatographic column. Elution of the column with 15% ethyl acetate in benzene affords 3β,17α,21-trihydroxypregn-4-ene-11,20-dione 3,17,21-triacetate. This material is dissolved in 8 parts of methanol, in a nitrogen atmosphere, and 6.7 parts by volume of 0.8 N potassium hydroxide in methanol is added. After standing for about 4 minutes, 11 parts by volume of 0.9 N acetic acid is added, and the resulting mixture is extracted with chloroform. The organic extract is separated, washed with water, dried by means of anhydrous sodium sulfate, and concentrated to dryness. Crystallization of the resulting residue from ether affords 3β,17α,21-trihydroxypregn-4-ene-11,20-dione 3-acetate, melting at about 180–183°. Further purification by recrystallization from acetone-hexane affords the pure substance, melting at about 190–194° and displaying an optical rotation of +67° in chloroform. Infrared absorption maxima are observed at about 2.73, 2.83, 3.39, 5.81, 7.96, 9.53, 9.75, 10.90, and 11.07 microns. This substance is represented by the structural formula

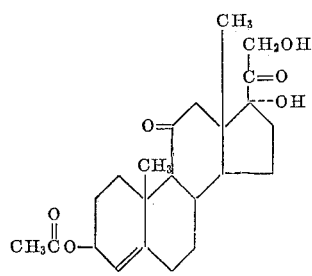

*Example 14*

A mixture of 6.5 parts of 3β,17α,21-trihydroxypregn-4-ene-11,20-dione 3-acetate, 1000 parts by volume of 50% aqueous acetic acid, and 100 parts of sodium bismuthate is stirred at room temperature for about 45 minutes, then is filtered through diatomaceous earth. The diatomaceous earth is washed with 50% aqueous acetic acid, and the filtrate is diluted with water, then extracted with chloroform. Successive washings of the chloroform solution with water and dilute aqueous sodium bicarbonate affords an organic solution which is dried by means of anhydrous sodium sulfate, then is concentrated to dryness at reduced pressure. Trituration of the resulting residue with ether affords crystals of 3β-hydroxyandrost-4-ene-11,17-dione 3-acetate, characterized by infrared absorption maxima at about 3.40, 5.77–5.85, 8.02, 8.30, and 9.81 microns.

The substitution of 9.15 parts of 3β-hydroxyandrost-4-ene-11,17-dione 3-acetate in the processes described in Example 1 results in 3β,17β-dihydroxyandrost-4-en-11-one 3-acetate of the structural formula

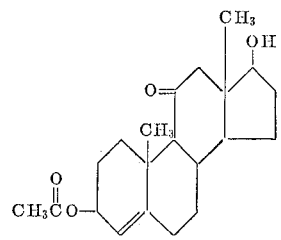

*Example 15*

By substituting 9.15 parts of 3β-hydroxyandrost-4-ene-11,17-dione 3-acetate and otherwise proceeding according to the procedure of Example 7, androst-4-ene-3β,11β,17β-triol 3-acetate is obtained. It is represented by the structural formula

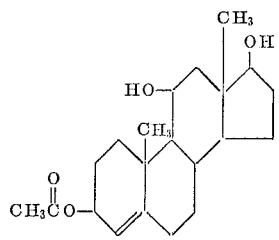

What is claimed is:
1. A compound of the formula

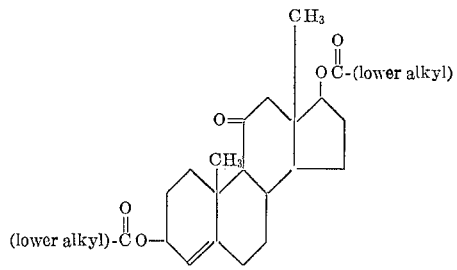

2. 3β,17β-dihydroxyandrost-4-en-11-one 3,17-diacetate.
3. A compound of the formula

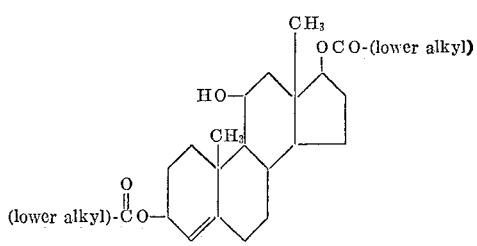

4. Androst-4-ene-3β,11β,17β-triol 3,17-diacetate.
5. Androst-4-ene-3β,11β,17β-triol 17-acetate, 3-propionate.
6. Androst-4-ene-3β,11β,17β-triol 3,17-dipropionate.

7. A compound of the formula

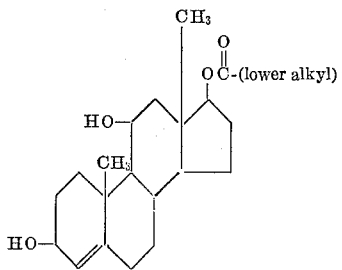

8. Androst-4-ene-3β,11β,17β-triol-17-acetate.
9. A compound of the formula

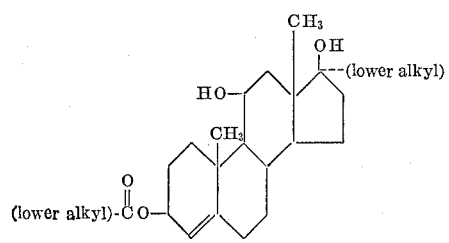

10. 17-methylandrost-4-ene-3β,11β,17β-triol 3-acetate.
11. 3β,17β-dihydroxyandrost-4-en-11-one.
12. 3β,17α,21-trihydroxypregn-4-ene-11,20-dione 3-acetate.

13. A compound of the formula

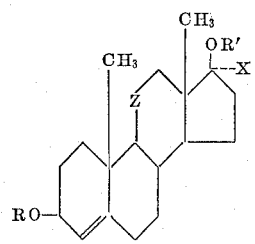

wherein X is a member of the class consisting of hydrogen and lower alkyl, Z is selected from the group of radicals consisting of carbonyl and β-hydroxymethylene, R is selected from the group consisting of hydrogen and lower alkanoyl, R' is selected from the group consisting of hydrogen and lower alkanoyl when R is lower alkanoyl and R' is lower alkanoyl when R is hydrogen.

References Cited by the Examiner
UNITED STATES PATENTS
3,109,850 11/63 Wettstein et al. _____ 260—297.5
3,118,881 1/64 Wettstein et al. _____ 260—239.55

OTHER REFERENCES
Caspi et al.: Journ. Chem. Soc. (May 1962), pages 1710–1716 relied on.

LEWIS GOTTS, *Primary Examiner.*